(12) United States Patent
Birke et al.

(10) Patent No.: US 9,825,340 B2
(45) Date of Patent: Nov. 21, 2017

(54) ELECTRIC ENERGY STORAGE DEVICE HAVING A RADIO-CONTROLLED SWITCH FOR DISCHARGING ENERGY USING AN INTEGRATED DEEP DISCHARGE DEVICE

(75) Inventors: Peter Birke, Nordbahn (DE); Lutz Elsholz, Berlin (DE); Michael Schiemann, Berlin (DE); Hans-Georg Schweiger, Ingolstadt (DE)

(73) Assignee: Continental Automotive GmbH, Hannover (DE)

( * ) Notice: Subject to any disclaimer, the term of this patent is extended or adjusted under 35 U.S.C. 154(b) by 341 days.

(21) Appl. No.: 13/503,498

(22) PCT Filed: Oct. 13, 2010

(86) PCT No.: PCT/EP2010/065363
§ 371 (c)(1),
(2), (4) Date: Jun. 19, 2012

(87) PCT Pub. No.: WO2011/047999
PCT Pub. Date: Apr. 28, 2011

(65) Prior Publication Data
US 2012/0249076 A1    Oct. 4, 2012

(30) Foreign Application Priority Data
Oct. 21, 2009   (DE) .................. 10 2009 050 125

(51) Int. Cl.
*H02J 7/00* (2006.01)
*H01M 10/44* (2006.01)
(Continued)

(52) U.S. Cl.
CPC ......... *H01M 10/44* (2013.01); *H01M 10/488* (2013.01); *H01M 10/613* (2015.04);
(Continued)

(58) Field of Classification Search
CPC .. H01M 10/443; H01M 10/44; H01M 10/448; H02J 2007/0067; H02J 7/0026
(Continued)

(56) References Cited

U.S. PATENT DOCUMENTS 4,415,847 A * 11/1983 Galloway ........... H01M 10/365
165/300
4,670,746 A * 6/1987 Taniguchi et al. ........... 340/5.62
(Continued)

FOREIGN PATENT DOCUMENTS

DE        10328862 A1     1/2005
JP        2004532416 A    10/2004
(Continued)

OTHER PUBLICATIONS

Nakai et al., "Battery PAck", Nov. 11, 2004. PAJ. pp. 1-9.*

*Primary Examiner* — Stacy Whitmore
(74) *Attorney, Agent, or Firm* — Laurence A. Greenberg; Werner H. Stemer; Ralph E. Locher

(57) ABSTRACT

An electric energy storage device has a housing, a positive pole and a negative pole, and a deep discharge device integrated in the housing. The device further has a discharge load and it is configured such that the two poles can be electrically connected by way of the discharge load. There is enabled targeted and controlled deep discharging of the energy storage device and improved operating reliability.

6 Claims, 1 Drawing Sheet

(51) Int. Cl.
  *H01M 10/625* (2014.01)
  *H01M 10/613* (2014.01)
  *H01M 10/48* (2006.01)
  *H01M 10/6551* (2014.01)
  *H01M 10/6561* (2014.01)
  *H01M 10/6567* (2014.01)

(52) U.S. Cl.
  CPC ........ *H01M 10/625* (2015.04); *H01M 10/443* (2013.01); *H01M 10/6551* (2015.04); *H01M 10/6561* (2015.04); *H01M 10/6567* (2015.04); *H02J 7/0026* (2013.01); *H02J 2007/0067* (2013.01)

(58) Field of Classification Search
  USPC ................................. 320/131–132, 135–136
  See application file for complete search history.

(56) References Cited

U.S. PATENT DOCUMENTS

| | | | | |
|---|---|---|---|---|
| 5,132,176 | A * | 7/1992 | Valentine et al. | 429/91 |
| 5,250,904 | A * | 10/1993 | Salander et al. | 324/430 |
| 5,758,224 | A * | 5/1998 | Binder et al. | 399/25 |
| 6,014,012 | A * | 1/2000 | Murao | G01R 31/362 |
| | | | | 320/116 |
| 6,057,050 | A * | 5/2000 | Parise | B01F 5/0614 |
| | | | | 320/137 |
| 6,146,783 | A * | 11/2000 | Brohm | H01M 2/1094 |
| | | | | 429/120 |
| 6,270,916 | B1 * | 8/2001 | Sink et al. | 429/7 |
| 6,419,384 | B1 * | 7/2002 | Lewis | A01K 7/00 |
| | | | | 200/61.45 R |
| 6,437,542 | B1 * | 8/2002 | Liaw | H01M 10/445 |
| | | | | 320/147 |
| 6,518,731 | B2 * | 2/2003 | Thomas et al. | 320/136 |
| 6,531,846 | B1 * | 3/2003 | Smith | 320/134 |
| 6,531,847 | B1 * | 3/2003 | Tsukamoto et al. | 320/135 |
| 6,608,468 | B2 * | 8/2003 | Nagase | 320/132 |
| 6,664,000 | B1 | 12/2003 | Sonobe | |
| 6,782,310 | B2 * | 8/2004 | Bailey et al. | 700/284 |
| 6,891,353 | B2 * | 5/2005 | Tsukamoto et al. | 320/136 |
| 7,190,147 | B2 * | 3/2007 | Gileff et al. | 320/127 |
| 7,218,078 | B2 | 5/2007 | Gagnon et al. | |
| 7,439,711 | B2 * | 10/2008 | Bolton | B60L 7/06 |
| | | | | 320/132 |
| 7,586,289 | B2 * | 9/2009 | Andruk et al. | 320/112 |
| 7,592,776 | B2 * | 9/2009 | Tsukamoto et al. | 320/136 |
| 7,679,334 | B2 * | 3/2010 | Suzuki et al. | 320/136 |
| 7,772,850 | B2 * | 8/2010 | Bertness | 324/426 |
| 8,013,574 | B2 * | 9/2011 | Naganuma et al. | 320/118 |
| 8,098,051 | B2 * | 1/2012 | Litingtun et al. | 320/150 |
| 8,183,835 | B2 * | 5/2012 | Takeda et al. | 320/134 |
| 8,198,900 | B2 * | 6/2012 | Bertness et al. | 324/426 |
| 8,823,329 | B2 * | 9/2014 | Sloop et al. | 320/136 |
| 8,928,190 | B2 * | 1/2015 | Karren | H01M 2/1022 |
| | | | | 307/139 |
| 2001/0040061 | A1 * | 11/2001 | Matuda | B60H 1/00278 |
| | | | | 180/68.2 |
| 2002/0036481 | A1 * | 3/2002 | Nagase | 320/132 |
| 2003/0157045 | A1 * | 8/2003 | Ovshinsky | B60K 1/04 |
| | | | | 424/69 |
| 2004/0012374 | A1 * | 1/2004 | Kamenoff | H02J 7/0063 |
| | | | | 320/135 |
| 2004/0209161 | A1 * | 10/2004 | Dubac | H02J 7/0003 |
| | | | | 429/149 |
| 2005/0029990 | A1 * | 2/2005 | Tsukamoto et al. | 320/135 |
| 2005/0194927 | A1 * | 9/2005 | Gileff et al. | 320/112 |
| 2006/0187072 | A1 * | 8/2006 | Bruce | H01M 10/425 |
| | | | | 340/636.1 |
| 2006/0214508 | A1 * | 9/2006 | Binder | 307/10.7 |
| 2007/0096694 | A1 * | 5/2007 | Barrella | 320/132 |
| 2007/0128505 | A9 * | 6/2007 | Yahnker | B25F 5/008 |
| | | | | 429/62 |
| 2007/0132431 | A1 * | 6/2007 | Bruce | H01M 10/425 |
| | | | | 320/149 |
| 2007/0273333 | A1 * | 11/2007 | Andruk et al. | 320/135 |
| 2008/0252259 | A1 * | 10/2008 | Suzuki et al. | 320/136 |
| 2008/0292948 | A1 * | 11/2008 | Kumar | H01M 2/1077 |
| | | | | 429/120 |
| 2009/0115372 | A1 * | 5/2009 | Naganuma et al. | 320/136 |
| 2011/0095726 | A1 * | 4/2011 | Bruce | H01M 10/425 |
| | | | | 320/136 |
| 2011/0127945 | A1 * | 6/2011 | Yoneda | 320/101 |
| 2011/0156497 | A1 * | 6/2011 | Karren et al. | 307/139 |

FOREIGN PATENT DOCUMENTS

| | | |
|---|---|---|
| JP | 2004-319304 A | 11/2004 |
| JP | 2006190520 A2 | 7/2006 |
| KR | 2003-0075862 A | 9/2003 |

* cited by examiner

ELECTRIC ENERGY STORAGE DEVICE HAVING A RADIO-CONTROLLED SWITCH FOR DISCHARGING ENERGY USING AN INTEGRATED DEEP DISCHARGE DEVICE

BACKGROUND OF THE INVENTION

Field of the Invention

The invention relates to an electric energy storage device having an integrated deep discharge device.

Energy storage devices, such as are used, for example, in hybrid and/or electric vehicles, are electrochemical or electrostatic in nature. These energy storage devices are able to release the stored energy within a very short time and without noticeable delay. With electrochemical energy storage devices, the release of energy is limited only by the internal electrical resistance, the ion diffusion within the battery cells and the capacity.

In the case of uncontrolled energy release, for example in the event of a short circuit, very high voltages and current strengths can occur. In the case of a short circuit, energy storage devices of this kind can be a source of danger to human health.

A risk to human health due to an uncontrolled release of energy of the energy storage device can occur, for example, when an energy storage device of this kind is recycled. Recycling of the energy storage device often requires the energy storage device housing to be opened and the energy storage device to be dismantled into individual parts. This work is usually carried out manually, wherein unintentional short circuits can occur during dismantling, resulting in a hazard to the person entrusted therewith.

BRIEF SUMMARY OF THE INVENTION

It is the object of the present invention to provide an electric energy storage device which is distinguished by increased safety when decommissioning or dismantling.

This object is achieved by the energy storage device as claimed in the independent claim. Advantageous embodiments of the invention are the subject matter of the dependent claims.

An electric energy storage device as claimed comprises a housing, a positive pole, a negative pole and a deep discharge device integrated in the housing. The deep discharge device comprises a discharge load and is designed in such a way that the two poles can be electrically connected by means of the discharge load.

The core idea of the invention is to integrate a deep discharge device into the electric energy storage device, by means of which a targeted, controlled and simple deep discharge of the energy storage device is possible. Here, deep discharge is understood to mean a complete discharge, and at least a discharge of the energy storage device under the usual specified operating limits (e.g. final discharge voltage). The duration of the discharge process is determined by the design of the discharge load. Here, a discharge load is understood to mean any electrical/electronic component, by means of which a dissipation, i.e. a conversion into heat, of the energy stored in the energy storage device is possible. Possible examples of discharge loads are electrical resistor, coil, transistor, etc. On completion of the discharge process, the energy stored in the electric energy storage device is dissipated to such an extent that the electric energy storage device can be dismantled manually without danger. This therefore reliably avoids an unintentional spontaneous discharge with a release of high energy and a formation of arcs. In this way, safety during decommissioning and dismantling of the electrical energy storage device can be increased.

In an embodiment of the electric energy storage device as claimed it has a cooling device, wherein the discharge load is thermally coupled to the cooling device.

Considerable amounts of heat energy are released when discharging the electric energy storage device via the discharge load. To conduct this thermal energy away from the discharge load, the latter is thermally coupled to the cooling device of the energy storage device. In this way, it is possible to effectively counteract overheating and a possible risk of fire.

In an embodiment of the electric energy storage device as claimed it has a control display which is designed in such a way that it displays the state of charge of the energy storage device.

In this way, it is possible to easily monitor the progress of the discharge process and to quickly detect the end of the discharge process.

In an embodiment of the electric energy storage device as claimed the deep discharge device has a switch which can be switched between a passive switch position, in which the poles are electrically separated, and a discharge switch position, in which the poles are electrically connected by means of the discharge load.

The deep discharge device can be easily activated and the discharge process initiated by means of the switch (also contactor or relay).

In an embodiment of the electric energy storage device as claimed the switch is in the form of a manually operated switch, a radio-controlled switch or a software-controlled switch.

In the case of a manually operated switch, the person carrying out the work can initiate the discharge process directly at the electric energy storage device. Here, the manually operated switch must be provided on or in the housing of the energy storage device so that it is accessible to the person carrying out the work. In the case of a radio-controlled switch, the discharge process can be carried out automatically at any time of day or in a special safety area. In the case of a software-controlled switch, the function can be initiated via a computer interface.

In an embodiment of the electric energy storage device as claimed the switch is designed in such a way that it is irreversible when switching from the passive switch position to the active switch position.

This ensures that the discharge process is not unintentionally interrupted but is carried out until complete discharge is achieved.

In an embodiment of the electric energy storage device as claimed the electric energy storage device has one of the following protective devices in order to prevent unintentional connection of the two poles by the deep discharge device:

- a locking device, which prevents operation of the switch in the locked state and enables operation of the switch only in the unlocked state;
- a protective cover, which covers the switch and is designed in such a way that it must be removed or destroyed in order to operate the switch;
- an electronic coding, which is designed in such a way that the switch can only be operated after correctly entering a specified code.

an electronic coding, which is designed in such a way that the switch can only be operated by transmitting a code via a defined interface.

The above-mentioned protective devices prevent an unintentional discharge of the energy storage device by means of the deep discharge device.

The invention is explained again below based on an exemplary embodiment with reference to the attached figures. In the figures,

DESCRIPTION OF THE INVENTION

Figure 1A:
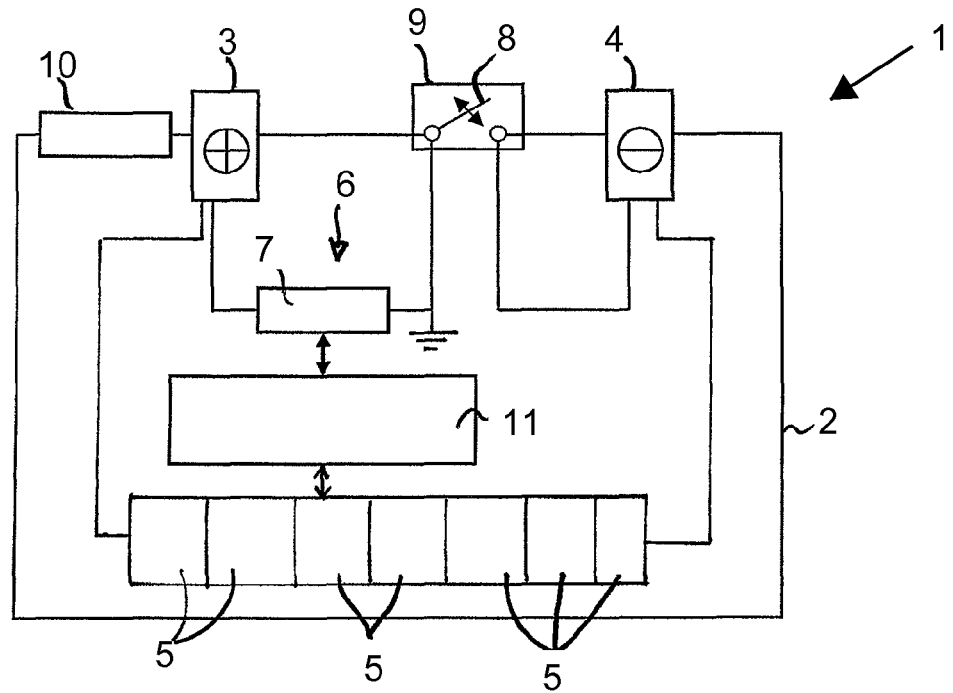
FIGS. 1A and 1B: are a schematic representation of an electric energy storage device with integrated deep discharge device, wherein, in FIG. 1A, the discharge process has not yet started, while, in FIG. 1B, the discharge process of the energy storage device has been initiated.
Figure 1B:
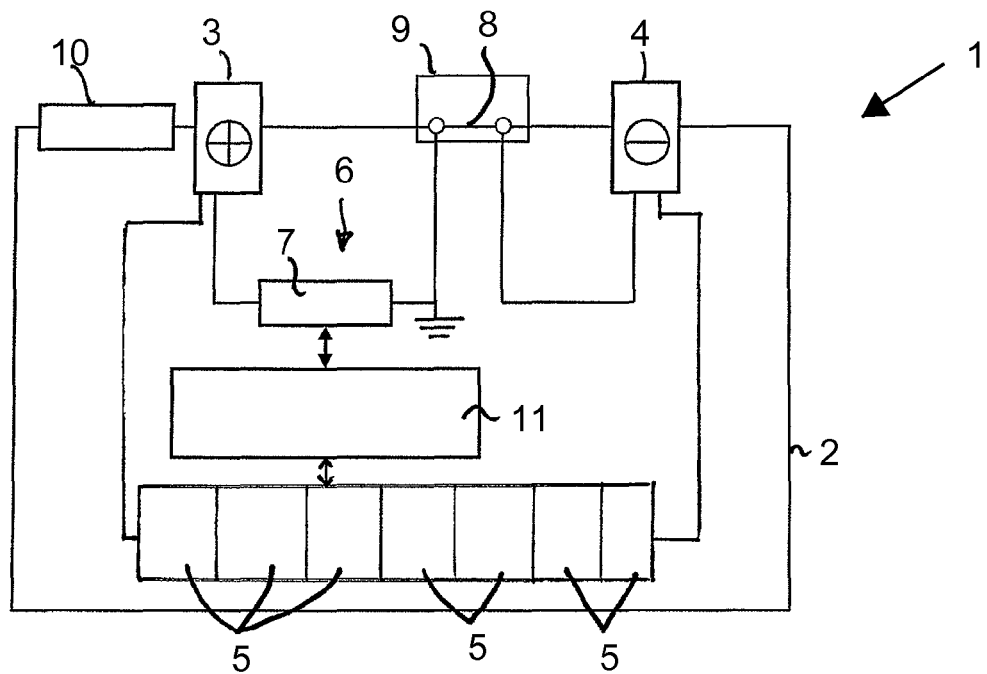

An exemplary embodiment of an electric energy storage device 1 is shown schematically in FIGS. 1A and 1B. The energy storage device has a housing 2, a positive pole 3 and a negative pole 4. Energy can be extracted from or fed to the energy storage device 1 via the positive pole 3 and the negative pole 4. The energy storage device 1 can be an electrochemical or an electrostatic energy storage device. Examples of electrochemical energy storage devices are lead batteries and nickel-metal-hydride, nickel-zinc or lithium-ion energy storage devices. A double layer capacitor is cited as an example of an electrostatic energy storage device. A combination of a plurality of cell types and/or double layer capacitors is also possible. The energy storage device 1 can comprise one or more electrochemical and/or electrostatic storage cells 5 which are electrically connected to one another (series connection and/or parallel connection) and the energy of which can be taken off externally for the poles 3, 4.

The energy storage device in the exemplary embodiment is an electrochemical energy storage device 1. Here, the storage, generation and provision of electrical energy are realized by means of a multiplicity of battery cells 5 connected in series. These are connected to the positive pole 3 and to the negative pole 4 of the energy storage device 1 in such a way that electrical energy can be fed in or taken off from the outside via the positive pole and the negative pole 4 to the battery cells 5.

The same applies for an electrostatic energy storage device, wherein here, instead of the battery cells, one or more double layer capacitors are connected in series and are connected to the negative pole 4 and to the positive pole 3.

A combination of electrochemical and electrostatic cells in the energy storage device is also conceivable. Furthermore, it is conceivable to connect the battery cells 5 or electrostatic cells at least partially in parallel.

The energy storage device 1 has a deep discharge device 6 which is integrated in the housing 2 and comprises a discharge load 7 in the form of an electrical resistor, a coil, a transistor 7, etc. and which is designed in such a way that the two poles 3, 4 can be electrically connected by means of the discharge load 7. Any electrical component which enables a controlled dissipation of the energy stored in the energy storage device 1 can be considered for the discharge load.

The discharge load 7 is earthed with respect to ground and is sized in such a way that the discharge of the energy storage device 1 can be carried out in a controlled manner but at the same time speedily (in the range of hours or days).

In the exemplary embodiment of FIGS. 1A and 1B, the deep discharge device 6 has a switch 8 which can be switched between a passive switch position (FIG. 1A), in which the poles 3, 4 are electrically separated, and a discharge switch position (FIG. 1B), in which the poles are electrically connected by means of the discharge load 7. The switch 8 can be a manually operated or a radio-controlled switch. In the case of a manually operated switch 8, this is advantageously attached to the housing 2 so that it is accessible from the outside. In the case of a radio-controlled switch 8, this can also be arranged inside the housing 2 and inaccessible from the outside. This ensures that this switch can only be operated by a specialist with an appropriate radio control device.

The switch 8 can be designed in such a way that a switching operation from the passive switch position to the discharge switch position is irreversible. In the case of a manually operated switch 8, this can be realized, for example, in that, when the switch 8 is moved from the passive switch position to the discharge switch position, it latches due to a suitable mechanism and cannot be released from this latched discharge switch position. In the case of a radio-controlled switch 8, this can be realized in that no suitable radio signal for switching from the discharge switch position to the passive switch position is provided.

In order to prevent the two poles being connected unintentionally by means of the deep discharge device 6, this has a protective device 9. The protective device 6 can be in the form of a mechanical lock, for example, which only enables the switch 8 to be operated and the two poles 3, 4 to be connected in the unlocked state. As a specific example, for this purpose, the switch 8 can be in the form of a key switch, wherein, to switch the switch 8 from the passive switch position to the discharge switch position, a key (not shown) must be inserted in a lock (not shown) integrated within the switch 8 and turned in order to switch the switch 8 from the passive switch position to the discharge switch position. A further example of the protective device is a combination lock (not shown) which must be opened before the switch 8 is operated, or a piece of software which must be transmitted from the computer via a defined interface.

A protective cover, which covers the switch 8 and is designed in such a way that it must be removed or destroyed in order to operate the switch 8, is conceivable as a further exemplary embodiment of the protective device 9. The protective cover can be made of glass or plastic, for example.

A further embodiment of the protective device 9 would, for example, be an electronic coding, which can be used particularly in the case of radio-controlled switches. In order to transmit the appropriate radio signal which initiates the changeover from the passive switch position to the discharge switch position, a specified code must first enable this functionality.

In the exemplary embodiment, the electric energy storage device 1 has a control display 10, which is designed in such a way that it displays the state of charge of the energy storage device 1 during the discharge process via the deep discharge device 6. The state of charge of the energy storage device 1 can be established by determining the voltage dropped across the discharge load 7 for example. The control display can display the state of charge directly as a voltage value in volts, for example, or in the form of a black-and-white/color display by means of appropriate coloring. It is therefore possible, for example, that the control display 10 changes from the color red at a full state of charge to the color green which represents a complete discharge of the energy storage device. Intermediate colors are conceivable.

Furthermore, the electric energy storage device 1 has a cooling device 11 which is thermally coupled to the discharge load 7. For this purpose, the discharge load 7 is in heat-conducting contact with the cooling device 11. During the discharge process, the heat produced in the discharge load 7 is transmitted to the cooling device and dissipated therefrom. In this way, local overheating in the region of the discharge resistor 7 and possible fire damage can be prevented. The cooling device 11 can take the form of copper and/or aluminum heat exchanger plates which dissipate the heat produced in the discharge load 7 via appropriate cooling fins (not shown) to the environment of the energy storage device by convection. In a further embodiment, the cooling device 11 has channels through which a cooling liquid can flow. The heat produced in the discharge load 7 is dissipated to the outside via the cooling liquid. In this case, during the discharge process, the energy storage device 1 would be connected to an external coolant pump, which ensures that the cooling liquid flows through the cooling device 11. A very fast discharge is possible as a result of the very effective heat dissipation via the cooling liquid.

In the exemplary embodiment, the cooling device 11 is also thermally coupled to the battery cells 5. The cooling device is therefore a common cooling device which, on the one hand, ensures the cooling of the battery cells 5 during normal operation of the energy storage device 1 and, on the other, the cooling of the discharge resistor 7 during the discharge of the energy storage device 1 via the deep discharge device 6. In this way, the costs for the energy storage device 1 can be kept low and the energy storage device can be built in a compact manner.

It must be pointed out that, instead of a switch, the deep discharge device can also have two externally accessible connections which can be bridged by an operator by means of an electrical bridging element, for example a special switching device which is designed for appropriate switching currents.

The invention claimed is:

1. An electric energy storage device, comprising:
   a housing;
   a positive pole and a negative pole;
   a deep discharge device integrated in said housing and having a discharge load and a manually operated switch that is switchable between a passive switch position, in which said positive and negative poles are electrically separated, and a discharge switch position, in which said positive and negative poles are electrically connected together by way of said discharge load;
   a control display configured to display a state of charge of the energy storage device; and
   a protective cover disposed to cover said switch, said protective cover configured such that said protective cover must be removed or destroyed in order to enable an operation of said switch, said protective cover being made of glass or plastic;
   said manually activated switch attached to said housing to be accessible from outside said housing.

2. The electric energy storage device according to claim 1, wherein said switch is configured to render a switching operation from the passive switch position to the discharge switch position irreversible.

3. The electric energy storage device according to claim 1, further comprising a cooling device thermally coupled to said deep discharge load.

4. The electric energy storage device according to claim 3, wherein said cooling device includes a heat exchanging structure selected from the group consisting of heat exchanger plates and channels for receiving a cooling liquid.

5. The electric energy storage device according to claim 3, wherein said cooling device includes heat exchanger plates.

6. The electric energy storage device according to claim 3, wherein said cooling device includes channels for receiving a cooling liquid.

* * * * *